Patented Feb. 8, 1944

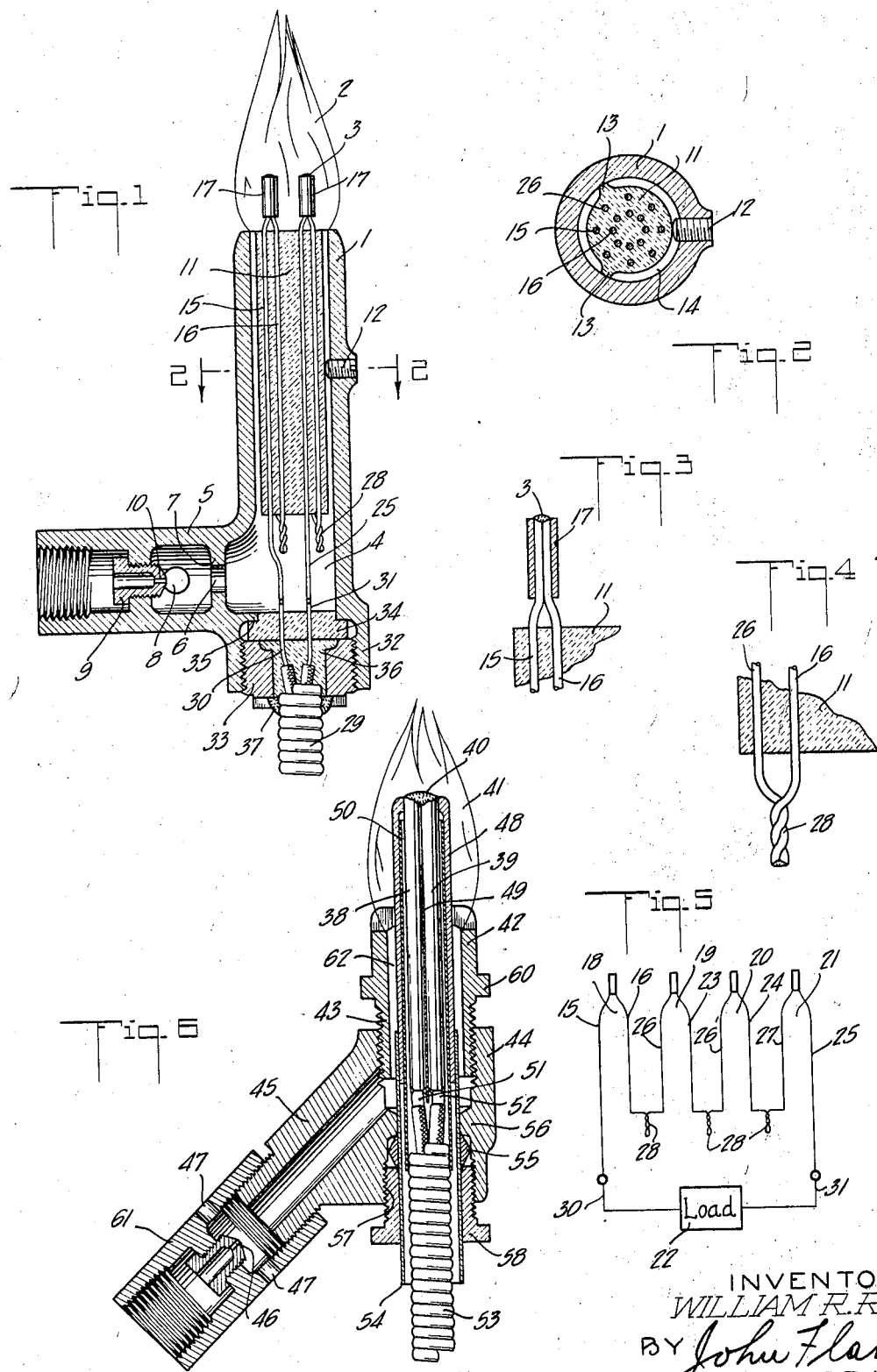

2,340,899

UNITED STATES PATENT OFFICE 2,340,899

THERMOCOUPLE STRUCTURE

William R. Ray, Glendale, Calif.

Application October 13, 1939, Serial No. 299,322

5 Claims. (Cl. 136—4)

This invention relates to the generation of an electric current by the aid of heat. More particularly, the invention involves the use of a thermocouple or a series of thermocouples, dependent for their operation upon the heating of a junction between two dissimilar metals. Thermocouple structures are now well recognized and are often used for generation of current for operation of control circuits; such as for safety systems for fuel burners.

For these purposes, the thermocouple arrangement is made so as to be supported by the pilot burner structure, and is heated by the pilot flame. The current generated may be passed to a delicate relay mechanism for causing the main burner valve to be closed upon the occurrence of certain eventualities, such for example as the extinguishing of the pilot flame.

It is one of the objects of this invention to improve the structure of such thermocouples.

It is another object of the invention to provide a thermocouple structure that can be simply constructed and easily assembled.

The effectiveness of the thermocouple depends mainly upon the provision of a large temperature difference between the hot junctions and the cold junctions. It is accordingly still another object of this invention to ensure that the hot junction may be subjected to the heat of the flame, while yet providing for the cooling of the cold junctions.

In thermocouples of this character, the dissimilar metals, are usually alloys that can withstand the temperatures to which they are exposed, and otherwise resist deterioration. Such alloys for example, Chromel and Copel, are quite expensive and therefore it is desirable to utilize as little of them as possible. This requirement involves the use of rather short pieces; and the problem of maintaining the temperature of the cold junctions at an effective low value is quite serious. By the aid of the present invention, the cold junctions are arranged in the stream of the fuel mixture, whereby the convection of heat is utilized for the cooling effect. It is still another object of this invention to provide a thermocouple structure that can be readily inserted into a pilot burner tip, so that the cold junctions are cooled by the fuel mixture, and whereby the hot junctions are positioned to be influenced by the flame.

This invention possesses many other advantages, and has other objects which may be made more easily apparent from a consideration of several embodiments of the invention. For this purpose there are shown a few forms in the drawing accompanying and forming part of the present specification. These forms will now be described in detail illustrating the general principles of the invention; but it is to be understood that this detailed description is not to be taken in a limiting sense, since the scope of the invention is best defined by the appended claims.

Referring to the drawing:

Figure 1 is a sectional view of a structure embodying the invention;

Fig. 2 is a cross sectional view, taken along the plane 2—2 of Fig. 1;

Fig. 3 is an enlarged fragmentary sectional view, illustrating the manner in which the hot junction of the thermocouple structure may be made;

Fig. 4 is an enlarged section taken along a plane oblique to the axis of the structure, illustrating how the cold junction can be made from one conductor of a couple to a conductor of the next couple;

Fig. 5 is a diagram illustrating a circuit in which the thermocouple structure may be utilized; and Fig. 6 is a view similar to Fig. 1 but showing a modified form of the device.

The thermocouple structure is shown as inporated within the tubular fuel jet burner 1 (Figs. 1 and 2). This fuel burner 1 is arranged to provide a flow of a combustible mixture to a flame 2 above the burner.

The tubular member 1 accommodates and supports a thermocouple structure having a series of hot and cold junctions, in such manner that the hot junctions 3 thereof are disposed directly in the flame 2, and the cold junctions 28 are disposed within the chamber or space 4 at the base of the burner structure, and exposed to the cooling stream of the cold fuel mixture passing upwardly through the tube 1.

Before describing the specific structure of the thermocouple, the manner in which the fuel mixture passes into the base 4 may be described.

Opposite the base of the burner tube 1, there is shown an integral tubular extension or intermediate branch 5, extending laterally from tube 1. This tubular extension 5 communicates with the base 4, as through an aperture 6 disposed in a flange or wall 7 extending around the interior of the tubular extension 5.

The left hand end of the extension 5 is shown as threaded for appropriate connection to a source of fuel supply, such as gas. The arrangement is similar to a Bunsen burner, air being drawn into the fuel stream, as for instance through one or more apertures 8. These apertures extend through the wall of extension 5, and communicate with the outside atmosphere. The fuel from the source of supply is conducted through the replaceable nozzle structure 9, having restricted aperture or jet 10 therein for the passage of fuel under pressure toward the base 4. Since the gaseous fuel is under pressure, it moves quite rapidly through the small aperture 10 and thereby acts to draw air into extension 5, through the apertures 8. The air and fuel intermingle in the base 4. Thence the fuel rises to the top of the burner 1, where it undergoes combustion in flame 2. The burner tube is shown as one suitable for operation as a pilot flame for a furnace burner; but obviously the invention is not limited to any specific type of burner.

The passage for the combustible fuel mixture to the flame 2 is defined between the inner wall of the tubular member 1, and a refractory plug-like member 11 disposed in member 1. This member 11 may be of such material as porcelain, and serves as a support for one or more pairs of thermocouple conductors. It may be held in place within the tubular member 1 by the aid of a set screw 12, passing radially through the wall of the member 1, and contacting the member 11. This member 11 may conveniently be formed with several short longitudinal ribs 13, for ensuring that the member 11 will have substantial clearance to form the substantially annular space 14 for the passage of the fuel mixture around the member 11.

In the present instance, the member 11 is shown as supporting eight thermocouple units. Preferably these units are arranged so that two conductors forming any pair are arranged to fall on a common radius with respect to the axis of the member 11, as shown most clearly in Fig. 2. Thus all of the conductors in the inner annulus are of the same material, such as Chromel; and all the conductors in the outer annulus are of the same material such as Copel.

Since each of the thermocouple units are alike, it is necessary to describe but one of them in detail. Each of the thermocouple units includes the pair of conductors 15 and 16 which extend longitudinally through the refractory member 11. This member, being of insulating material such as a vitreous or clay product, serves to keep the conductors isolated. These conductors are made of dissimilar metals or alloys; for example, such as Chromel and Copel, which are alloys capable of withstanding high temperatures.

The upper ends of the conductors 15 and 16 are caused to contact each other, and at their extremities they are fused together to form the hot junction 3. Immediately below the hot junction there is a stainless steel jacket 17 closely encompassing the conductors 15 and 16.

The upper ends of conductors 15, 16, are extended beyond the burner 1, so as to be disposed within the flame 2. In order to cause the generation of an electric current, the lower ends of conductors 15 and 16, extended downwardly into the base 4, are cooled by being in the path of the inflowing fuel and air mixture. In this manner the cold junctions are subjected to the cooling convection effects produced by the stream of the fuel mixture passing through the burner tube 1.

As indicated in the diagram of Fig. 5, the plurality of thermocouple units such as 18, 19, 20, 21, etc., may be connected in series to a load 22, such as an electromagnet for the control system associated with the furnace. Although only four thermocouple units are indicated in this diagram, it is to be understood that any suitable number may be placed in series relation. The units are connected in series by connecting the lower ends of each of those conductors 16, 23, 24, etc., that are arranged in the inner circle of Fig. 2, respectively to the lower ends of conductors 26, 26', 27, etc., arranged in the outer circle and corresponding respectively to a conductor of the next adjacent couple. Conductor 15, in the outer circle, and the last inner conductor 25 of the series may form the terminals of the series of thermocouples. These connections below the ceramic member 11 may be twisted and fused together, to form the cold junctions 28 (Fig. 4).

In spite of the fact that intense heat is applied to the exposed hot junctions 3 within the flame 2, the cold junctions 28 are kept sufficiently cool to secure the desired temperature differential.

The manner in which connections may be made to the end conductors 15 and 25 is shown most clearly in Fig. 1. Thus an armored twin conductor cable 29 may be utilized. The conductors or leads 30 and 31 thereof may be joined respectively to the ends of the conductors 15 and 25, as by welding or fusing them together.

In the form illustrated in Fig. 1, the armored cable 29 is shown as extending upwardly through the hollow threaded lower portion 32 of the burner structure. This threaded lower portion, shown as coaxial with the tubular member 1, accommodates a metallic threaded hollow plug 33, through which the exposed conductors 30 and 31 may extend upwardly. A refractory insulating disk 34, such as porcelain, may be interposed between the metal plug 33 and the internal flange 35 disposed at the bottom of the space 4. An appropriate refractory plastic sealing and insulating compound 36 may be provided within the hollow metallic plug 33, around the conductors 30, 31 for ensuring against fuel leakage through the extension 32.

The armored cable 29 may be soldered or welded to the plug 33 after assembly, as indicated at 37.

The thermocouple structure including the plug 11 may be inserted either from the top of the burner 1 or through the extension 32, prior to the assembly of the conductors 30 and 31 with the conductors 15 and 25.

It is not essential that more than one pair of thermocouple conductors be utilized in the structure, the number of pairs of conductors being dependent upon the desired electromotive forces which the thermocouple structure is to generate. In the form show in Fig. 6, a thermocouple employing a single hot junction is illustrated. In this form of the invention, the thermocouple conductors 38 and 39 (of comparatively large cross section) are shown as joined as by being fused together at their upper ends 40 to form the hot junction. This hot junction is shown as enveloped by the flame 41 of the burner; and the thermocouple structure is shown as supported within the burner head 42.

The burner head 42 in this form is shown as having a lower threaded extension 43 threaded into the top of a base structure 44. A collar 60 may be provided around head 42 to facilitate turning it into the threads of base 44. This base 44 has a downwardly directed tubular extension or branch 45 for conducting the mixture of gas and air to the open bottom of the head 42. This mixture is formed by the aid of the incoming gas passing through the nozzle aperture 46 and past the air inlet apertures 47, formed within a coupling member 61.

In the present instance the thermocouple conductors 38 and 39 are shown as enveloped by a metal jacket 48, as of stainless steel. The exposed hot junction 40 may be fused to the top of this jacket 48, so that there is a definite connection between the jacket 48 and the conductors. A layer of insulation 49, such as thin mica, may be interposed between the thermocouple conductors 38 and 39. Similarly a mica tube 50 may be inserted within the jacket 48 and may surround the thermocouple conductors 38 and 39, to ensure against any short circuiting of the conductors below the hot junction. The fuel mixture thus passes through an annular passage 62 formed between jacket 48 and head 42.

The lower ends of the thermocouple conductors are shown as fused or otherwise attached respectively to the twin conductors or leads 51 and 52 of armored cable 53. These joints form the cold junctions. This armored cable 53 is shown as extending through the thin metal sleeve 54, which may be of brass, brazed to the bottom of the jacket 48. The metallic sheathe of cable 53 may be joined as by welding, soldering or brazing, to the interior of the tube 54. The cold junctions are shown in this instance as encompassed within the sleeve 54, and therefore not directly subjected to the cooling stream of the fuel mixture. However, the tube 54 is cooled thereby, and there is some transfer of heat through this tube and into the fuel stream.

The tubular member 54 is arranged to pass downwardly through the base 44 and past the apertured flange 56 located within the base 44. The tube 54 fits snugly within this aperture, to aid in rendering the structure air tight. The tube 54 also passes beyond the lower extremity of a threaded aperture 57, in the bottom of base 44. This threaded aperture is provided for the accommodation of a hollow threaded sealing plug 58 which fits snugly around the tube 54. The inner extremity of the plug 58 is arranged to engage a tapered collar 55 disposed around the tube 54 and made of deformable material, to form a seal around the tube. The upper edge of the collar 55 fits against the lower surface of the flange 56.

In this form of the invention, the cool mixture of fuel and air passes through the extension 45 into the head 42, and past the metal sheathe 48. The cold junctions formed between the conductors 38 and 39 and leads 51 and 52 transmit heat to the tube 54, which is cooled by the passage of the stream of fuel mixture around the sheathe 48.

What is claimed is:

1. In combination, a tubular fuel jet burner, a refractory member supported within the burner forming therewith a passageway for combustible fuel, and a pair of conductors made from dissimilar metals, supported by the aid of said refractory member, and having ends exposed beyond the opposite faces of the refractory member, the ends beyond at least one face of said member being joined.

2. In combination, a tubular fuel jet burner, a refractory member supported within the burner and to form therewith a passageway for combustible fuel, and a pair of conductors made from dissimilar metals, supported by the aid of said refractory member, and having ends exposed beyond the opposite faces of the refractory member, the ends beyond at least one face of said member being joined, the other ends of the conductors being in the path of the fuel stream within said burner.

3. In combination, a tubular fuel jet burner, means for leading a mixture of air and fuel into the base of said burner, and a thermocouple structure supported in said burner, having conductors of dissimilar metals, forming one or more hot junctions extending out of the burner, and one or more cold junctions within said base and exposed to the stream of the fuel mixture, said thermocouple structure including a refractory member, through which the conductors extend, said member defining an annular-like fuel space between it and the tubular member.

4. In combination, a tubular fuel jet burner, and a thermocouple structure supported within the burner, said structure having one or more hot junctions exposed in the flame of the burner, as well as cold junctions within the burner and spaced from the hot junctions, and a refractory member extending between said hot and said cold junctions, said refractory member cooperating with the tube of the burner to form an annular space for the passage of a combustible mixture to the burner, said mixture in passing through the annular space serving to cool the thermocouple structure.

5. In combination, a tubular member having a closure at one end, a refractory member supported within the tubular member and cooperating therewith to provide an annular space for the passage of a combustible mixture to the burner as well as a chamber above said closure for the reception of said mixture, means to supply said mixture to said chamber, the mixture being adapted to burn at the open end of the tubular member, and a thermocouple structure extending through the refractory member and having a hot and a cold junction at opposite ends thereof, the hot junction being exposed to the heat of the burner, the cold junction being within said chamber so as to be cooled by the incoming mixture, the passage of the mixture through the annular space serving to cool the refractory member and reduce the transfer of heat from the flame to the said cold junctions.

WILLIAM R. RAY.